US009399925B2

(12) United States Patent
Nakano et al.

(10) Patent No.: US 9,399,925 B2
(45) Date of Patent: Jul. 26, 2016

(54) SEAL STRUCTURE FOR ROTARY MACHINE

(75) Inventors: Takashi Nakano, Tokyo (JP); Shin Nishimoto, Tokyo (JP); Hidekazu Uehara, Takasago (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 12/993,886

(22) PCT Filed: Apr. 24, 2009

(86) PCT No.: PCT/JP2009/058202
§ 371 (c)(1),
(2), (4) Date: Dec. 3, 2010

(87) PCT Pub. No.: WO2009/150905
PCT Pub. Date: Dec. 17, 2009

(65) Prior Publication Data
US 2011/0068539 A1    Mar. 24, 2011

(30) Foreign Application Priority Data
Jun. 9, 2008  (JP) ................................ 2008-150929

(51) Int. Cl.
*F01D 25/26* (2006.01)
*F01D 11/02* (2006.01)
(Continued)

(52) U.S. Cl.
CPC .............. *F01D 11/025* (2013.01); *F01D 11/22* (2013.01); *F16J 15/442* (2013.01); *F05D 2240/55* (2013.01)

(58) Field of Classification Search
USPC .......................... 277/411, 412, 416, 421, 431
See application file for complete search history.

(56) References Cited

U.S. PATENT DOCUMENTS 3,906,730 A * 9/1975 Bellati et al. ..................... 60/657
3,909,012 A * 9/1975 Denis ............................. 277/432
(Continued)

FOREIGN PATENT DOCUMENTS

CN        1573024      2/2005
CN      101092886     12/2007
(Continued)

OTHER PUBLICATIONS

International Search Report issued Jul. 14, 2009 in International (PCT) Application No. PCT/JP2009/058202.
(Continued)

*Primary Examiner* — Eugene G Byrd
(74) *Attorney, Agent, or Firm* — Wenderoth, Lind & Ponack, L.L.P.

(57) ABSTRACT

A seal structure partitions a high-pressure portion and a low-pressure portion including spring-back seal rings on the high-pressure side, including ACC seal rings and fins on the low-pressure side. The ACC seal rings have an adjustable movable seal ring which is a movable seal ring that is movable in a substantially radial direction at a portion thereof and which partitions a high-pressure side steam chamber and a medium-pressure side steam chamber with the fins and a circumferential surface, and including a pressure equalizing pipe that connects the low-pressure side of the adjustable movable seal ring to a high-pressure outlet portion, is provided with an adjusting pipe that connects, on the high-pressure side steam chamber side of the ACC seal rings, a high-pressure dummy to the same high-pressure outlet portion as the medium-pressure side steam chamber, and an open/close valve in the adjusting pipe.

5 Claims, 5 Drawing Sheets

(51) Int. Cl.
*F16J 15/44* (2006.01)
*F01D 11/22* (2006.01)

(56) References Cited

U.S. PATENT DOCUMENTS

| | | | | |
|---|---|---|---|---|
| 3,994,503 | A * | 11/1976 | Dousse et al. | 277/347 |
| 4,078,809 | A * | 3/1978 | Garrick et al. | 277/304 |
| 4,193,603 | A * | 3/1980 | Sood | 277/304 |
| 4,341,093 | A * | 7/1982 | Oishi et al. | 62/505 |
| 4,606,652 | A * | 8/1986 | Swearingen | 384/130 |
| 5,085,443 | A * | 2/1992 | Richards | 277/412 |
| 5,603,510 | A | 2/1997 | Sanders | |
| 5,810,365 | A | 9/1998 | Brandon et al. | |
| 5,913,812 | A * | 6/1999 | Smith et al. | 60/657 |
| 6,116,612 | A * | 9/2000 | Halliwell et al. | 277/412 |
| 6,325,382 | B1 * | 12/2001 | Iwamoto et al. | 277/368 |
| 6,607,348 | B2 * | 8/2003 | Jean | 415/1 |
| 6,811,154 | B2 * | 11/2004 | Proctor et al. | 277/355 |
| 6,932,349 | B2 * | 8/2005 | Coppola | 277/409 |
| 6,957,945 | B2 * | 10/2005 | Tong et al. | 415/1 |
| 6,991,235 | B2 * | 1/2006 | Ebert et al. | 277/355 |
| 7,374,211 | B2 * | 5/2008 | Reifschneider et al. | 285/281 |
| 7,549,834 | B2 * | 6/2009 | Kirchhof et al. | 415/1 |
| 7,559,554 | B2 * | 7/2009 | Hogg et al. | 277/412 |
| 2003/0080513 | A1 | 5/2003 | Kirby, III et al. | |
| 2004/0100035 | A1* | 5/2004 | Turnquist et al. | 277/412 |
| 2005/0206087 | A1 | 9/2005 | Hogg et al. | |
| 2007/0292258 | A1 | 12/2007 | Kirchhof et al. | |
| 2008/0019821 | A1 | 1/2008 | Narita et al. | |
| 2008/0169616 | A1 | 7/2008 | Awtar et al. | |

FOREIGN PATENT DOCUMENTS

| | | |
|---|---|---|
| CN | 101096998 | 1/2008 |
| CN | 101109297 | 1/2008 |
| JP | 60-145404 | 7/1985 |
| JP | 2614211 | 9/1987 |
| JP | 63-227908 | 9/1988 |
| JP | 63-182368 | 11/1988 |
| JP | 2-41772 | 3/1990 |
| JP | 9-133004 | 5/1997 |
| JP | 2000-97352 | 4/2000 |
| JP | 2002-228013 | 8/2002 |
| JP | 2003-184508 | 7/2003 |
| JP | 2008-2680 | 1/2008 |
| JP | 2008-170005 | 7/2008 |

OTHER PUBLICATIONS

English translation of Japanese Office Action issued Aug. 9, 2011 in corresponding Japanese Patent Application No. 2008-150929.
Notification of the First Office Action (with English translation) issued Nov. 2, 2012 in corresponding Chinese patent application No. 200980121373.1.
Decision to Grant issued Jul. 25, 2013 in corresponding Korean patent application No. 10-2010-7027119.
Office Action issued May 15, 2014 in corresponding Chinese patent application No. 2009-80121373.1.
Notice of Allowance issued Oct. 27, 2014 in corresponding Chinese patent application No. 200980121373.1.
Extended European Search Report issued Dec. 16, 2014 in corresponding European patent application No. 09762335.9.
Decision to grant a European patent pursuant to Article 97 (1) EPC issued on Apr. 21, 2016 in corresponding European patent application No. 09762335.9.

* cited by examiner

SEAL STRUCTURE FOR ROTARY MACHINE

BACKGROUND OF THE INVENTION

I. Technical Field

The present invention relates to a seal structure used in a rotating shaft portion of a rotary machine.

II. Description of the Related Art

In a rotary machine, such as a steam turbine, a gas turbine, a compressor, etc., a so-called labyrinth seal structure is widely used as a seal structure for a rotating shaft portion.

A labyrinth seal structure is constituted of fins that are provided in multiple stages in the axial direction on a rotating shaft or a stationary portion facing it, protruding in a ring-like manner, and a surface that opposes these fins (opposing surface).

Because sealing performance, in other words, the performance of a rotary machine, is determined by the number of fins and a gap between the fins and the opposing surface, in order to enhance the performance of a rotary machine, there is a need for reducing the gap between the fins and the opposing surface.

Because a rotary machine is generally designed such that a rotating shaft rotates stably in a rated rotation speed range, while the rotation speed is increasing immediately after start-up, there is a speed range within which the vibration level of the rotating shaft reaches a maximum (hereinafter, this is referred to as "critical speed range"). The rotating shaft reaches the rated rotation speed range (rated operation) via this critical speed range.

In addition, where high-temperature steam is handled, for example, in a steam turbine, etc., the rotating shaft and the stationary portion thermally expand due to the high-temperature steam introduced after start-up; however, because, initially, there is large temperature unevenness in individual portions, partial differences occur in the thermal expansion of the rotating shaft and the stationary portion. Accordingly, because the rotating shaft and the stationary portion relatively move in the axial direction and the radial direction, the gap between the fins and the opposing surface narrows, posing the risk of contact between the fins and the opposing surface. When the fins come into contact with the opposing surface, the fins and the opposing surface are abraded, causing the set gap between the fins and the opposing surface during the rated operation to become larger than an initial setting; therefore, sealing performance deteriorates by a corresponding amount.

Because the gap between the fins and the opposing surface is set such that the fins do not come into contact with the opposing surface even with a vibration level in this critical speed range, it has not been possible to set a very small gap during rated operation.

As a countermeasure, for example, as disclosed in Japanese Unexamined Patent Application, Publication No. 2000-97352, a configuration that makes set gaps between fins and an opposing surface differ during start-up/shut-down and during the rated operation is used; that is, the gap is made large during start-up/shut-down to ensure safety and is made small during the rated operation to enhance the sealing performance.

This is achieved by a movable seal ring, in which a portion of a seal ring provided with fins mounted on a stationary portion is made radially movable and constantly biased outward by an elastic piece. In addition, an inner circumferential surface of the movable seal ring receives outward pressure from the passing working fluid. This pressure gradually decreases toward a low-pressure portion side. The working fluid of a high-pressure portion flows to an outer circumferential surface of the movable seal ring, and the movable seal ring is pressed inward with that pressure.

During a period in which the load is small and a pressure difference between the high-pressure portion and the low-pressure portion is small, as in during start-up/shut-down, because a pressure difference of the working fluid acting on the outer circumferential surface and the inner circumferential surface of the movable seal ring is not large, the movable seal ring is positioned at the outer side by a biasing force of the elastic piece. In other words, a state in which the set gap between the fins and the opposing surface is large is maintained.

When the load of a steam turbine increases, the pressure difference of the working fluid acting on the outer circumferential surface and the inner circumferential surface of the movable seal ring correspondingly increases; therefore, the movable seal ring moves inward by overcoming the biasing force of the elastic piece. Then, as the load increases, the movable seal ring moves to the inner end of a moving range. In other words, a state in which the set gap between the fins and the opposing surface is small is maintained.

In addition, a seal structure in which a coating of an abradable material that generates a small amount of heat during contact is formed on an opposing surface is also employed. Because the influence thereof at the time of unforeseen contact can be alleviated by the coating, this allows further reduction of the gap between fins and the opposing surface for enhancing the sealing performance.

SUMMARY OF THE INVENTION

With the disclosure in Japanese Unexamined Patent Application, Publication No. 2000-97352, the radial position of the movable seal ring, that is, the gap between the fins and the opposing surface, is automatically adjusted by pressure differences between the high-pressure portion and the low-pressure portion generated during the operation; however, at this time, a side surface on the low-pressure portion side of the movable seal ring is pressed against the stationary portion by the pressure of the high-pressure portion. Accordingly, when the movable seal ring radially moves, a friction force acts between this side surface on the low-pressure portion side and the stationary portion; therefore, an actuation range of the movable seal ring becomes variable depending on the coefficient of friction, which is determined by the properties of the sliding surfaces, and thus, specified actuation timing cannot be guaranteed. This influence becomes greater in a configuration in which differential pressure gradually increases/decreases, as in Japanese Unexamined Patent Application, Publication No. 2000-97352.

In addition, because the largest pressing force is received during the rated operation, the static friction force between the side surface on the low-pressure portion side and the stationary portion becomes the largest. Because of this, the actuation timing of the movable seal ring does not stabilize during a load drop in particular, resulting in hysteresis. Accordingly, for example, in the case of a load drop accompanied by a sudden steam-temperature-drop phenomenon in which the gap between the fins and the opposing surface quickly closes, there is risk of contact between the fins and the opposing surface due to a delay in withdrawing the movable seal ring radially outward.

The fins and the opposing surface also relatively move in the axial direction as described above; however, if the two come into contact during this movement, the risk of damaging the fins increases.

In addition, in the configuration in which the gap between the fins and the opposing surface is made small using a coating of an abradable material, the coating is scraped off at the surface by this contact, leading to a deterioration in sealing performance.

The present invention, in light of the problems described above, provides a seal structure in which the actuation of a movable seal ring can be actively controlled and that is capable of enhancing the sealing performance and of enhancing the reliability thereof, as well as a rotary machine employing the same.

In order to solve the problems described above, the present invention employs the following solutions.

That is, an aspect of the present invention is a seal structure for a rotary machine, which is a seal structure partitioning a high-pressure portion and a low-pressure portion including, on the high-pressure side thereof, at least one stage of high-pressure side seal rings held in a stationary portion, so as to oppose a circumferential surface of a rotating member; including, on the low-pressure side thereof, at least one stage of seal rings held in a stationary portion so as to oppose the circumferential surface of the rotating member and fins, which protrude in a ring-like manner, provided in at least one of the seal rings and the rotating member, the seal ring having an adjustable movable seal ring which is a movable seal ring that is movable in a substantially radial direction at least at a portion thereof in the circumferential direction and is biased outward by an elastic piece, and which partitions a high-pressure portion and a low-pressure portion with the fins and an opposing surface opposing the fins; and including a connecting flow path, which is connected to one pressure source, on a low-pressure side of the adjustable movable seal ring, the seal structure being provided with an adjusting flow path that connects a high-pressure portion side of the adjustable movable seal ring to the same pressure source as the low-pressure side; and an open/close valve that is provided in the adjusting flow path to open and close the adjusting flow path.

With this aspect, the movable seal ring is movable in the substantially radial direction and is biased outward by the elastic piece. On the other hand, pressure from passing fluid acts on the inner circumferential surface and the outer circumferential surface of the movable seal ring, serving as an outward force and an inward force, respectively. Although the pressure of the fluid acting on the inner circumferential surface gradually decreases toward the low-pressure portion side, because the pressure of the fluid acting on the outer circumferential surface is the pressure in the high-pressure portion, that is, on the high-pressure portion side of the seal ring, the force acting on the outer circumferential surface becomes greater than the force acting on the inner circumferential surface.

During a period in which the load is small and a pressure difference between a high-pressure portion and a low-pressure portion is small, as in during start-up/shut-down, because a pressure difference between the outer circumferential surface and the inner circumferential surface of the movable seal ring due to the working fluid acting thereon is not large, the movable seal ring is positioned at the outer side by the biasing force of the elastic piece. Therefore, because a state in which the set gap between the fins and the opposing surface is large is maintained, it is possible to prevent contact between the fins and the opposing surface by setting an adequate gap to cope with a sudden approaching of the fins and the opposing surface during start-up/shut-down.

When the load increases, because the pressure difference between the outer circumferential surface and the inner circumferential surface of the movable seal ring due to the fluid acting thereon correspondingly increases, the movable seal ring moves inward by overcoming the biasing force of the elastic piece. Then, as the load increases, the movable seal ring moves to the inner end of the moving range. Therefore, because a state in which the set gap between the fins and the opposing surface is small is maintained, sealing performance can be enhanced by setting this small.

In this aspect, at a position on the high-pressure portion side of the seal ring, the adjusting flow path that connects the flow path to the same pressure source as the low-pressure portion and the open/close valve that is provided in the adjusting flow path and opens and closes the adjusting flow path are provided; therefore, when the open/close valve is opened, the pressure on the high-pressure portion side of the seal ring is equalized by the pressure in the high-pressure portion, which is lowered to some extent by the high-pressure side seal ring and the pressure of the pressure source to which the adjusting flow path is connected. Because the adjusting flow path is connected to the same pressure source as the low-pressure portion, the pressure therein is substantially equivalent to the pressure in the low-pressure portion side of the seal ring. That is, a differential pressure between positions before and after the seal ring becomes small.

When the pressure difference between the high-pressure portion side and the low-pressure portion side is small in this way, because the pressure difference between the outer circumferential surface and the inner circumferential surface of the movable seal ring due to fluid acting thereon becomes small, the movable seal ring is positioned at the outer side by the biasing force of the elastic piece. Therefore, a state in which the set gap between the fins and the opposing surface is large is maintained.

When the open/close valve is opened, because the high-pressure side seal ring is provided, even when the pressure in the adjusting flow path decreases, this pressure drop does not directly propagate to the high-pressure portion, and therefore, it is possible to suppress problems caused by a pressure drop in the high-pressure portion.

On the other hand, when the open/close valve is closed, because the adjusting flow path, which is connected to the same pressure source as the low-pressure portion is shut off, the pressure in the high-pressure portion side of the seal ring acts directly on the seal ring. Therefore, depending on the magnitude of the pressure on the high-pressure side of the seal ring, the movable seal ring is positioned at the outer side or positioned at the inner side in accordance with the pressure in the high-pressure portion side of the seal ring, as described above.

For example, as in during start-up/shut-down, when the gap between the fins and the opposing surface and the positional relationship therebetween in the axial direction are in an unstable state, by leaving the open/close valve open, even if there is a large pressure difference between the high-pressure portion and the low-pressure portion, the movable seal ring can be positioned at the outer side in the substantially radial direction.

For the open/close valve, it is desirable to be closed when a rotating member and a stationary member are in a thermally stable state, in other words, for example, in a rated operation state or when the operation is in a stable state.

For example, during start-up, the open/close valve is open as an initial state so as to maintain a state in which the pressure difference between the high-pressure portion side and the low-pressure portion side is small, even when the load increases. Therefore, because the movable seal ring is positioned at the outer side and a state in which the set gap between the fins and the opposing surface is large is maintained, there will not be any contact between the two even when the actual gap greatly fluctuates (closes), which is safe.

Then, upon confirming that the rotating member and the stationary portion have reached a thermally stable state, the open/close valve is closed. When the rotating member and the stationary portion are in a thermally stable state in this way, because there is a large pressure difference between the high-pressure portion and the low-pressure portion, upon closing the open/close valve, the pressure in the high-pressure side of the seal ring suddenly increases. Accordingly, because the pressure difference between the outer circumferential surface and the inner circumferential surface of the movable seal ring due to the fluid acting thereon drastically increases, the movable seal ring overcomes the biasing force of the elastic piece and moves inward.

In addition, during shutting-down, when the rotating member and the stationary portion are in a thermally stable state, the closed open/close valve is opened. Upon opening the open/close valve, the pressure in the high-pressure portion side of the seal ring is quickly equalized by the pressure in the high-pressure portion and the pressure in the pressure source to which the adjusting flow path connects, thereby reaching a substantially equivalent pressure to the pressure in the low-pressure portion side of the seal ring.

Accordingly, because the pressure difference between the outer circumferential surface and the inner circumferential surface of the movable seal ring due to the fluid acting thereon decreases, the movable seal ring is positioned at the outer side due to the biasing force of the elastic piece.

As described above, with a configuration such that the open/close valve is closed when the rotating member and the stationary portion are in a thermally stable state, when opening or closing, pressure fluctuations in the high-pressure portion side of the seal ring increase and become drastic, and therefore, the force acting in a radial direction of the movable seal ring increases. Because of this, the movable seal ring can smoothly move in the radial direction without being affected by the friction force between the side surface thereof and the stationary portion. In other words, because the movable seal ring reliably moves in the radial direction due to the opening and closing of the open/close valve, the actuation timing can be guaranteed.

Accordingly, for example, even in the case of a load drop accompanied by a sudden steam-temperature-drop phenomenon in which the gap between the fins and the opposing surface quickly closes, because a delay in withdrawing the movable seal ring radially outward can be suppressed, the risk of contact between the fins and the opposing surface can be reduced.

In this way, the actuation of the movable seal ring in the radial direction can be reliably controlled by opening and closing the open/close valve. Accordingly, for example, the gap between the fins and the opposing surface during the rated operation can be set small, and thus, sealing performance can be enhanced. In addition, because, for example, contact between the fins and the opposing surface can be reliably prevented during start up/shut down by setting this gap large, reliability of the seal structure can be enhanced.

Note that a state in which the rotating member and the stationary portion are thermally stable is a state in which the rotating member and the stationary portion show almost no relative positional fluctuations in the axial direction and the radial direction.

This, for example, can be determined by a measurement signal from an extensometer that detects relative positional fluctuations in the axial direction between the rotating member and the stationary portion, and that from a gap sensor that detects relative positional fluctuations therebetween in the radial direction. Furthermore, in addition to these, the determination may be made by using the rotating speed, load condition, temperature, pressure, etc., together.

In the above-described aspect, it is preferable that a controller that controls opening and closing of the open/close valve described above be provided such that the controller closes the above-described open/close valve when the rotating member and stationary portion are in the thermally stable state.

The controller determines that the rotating member and the stationary portion are in the thermally stable state by appropriately using measurement results from a differential expansion recorder, a gap sensor, rotation speed, load condition, temperature, pressure, etc., and automatically closes the open/close valve when in the stable state.

In the above-described aspect, an abradable coating constituted of an abradable material may be formed on the above-described opposing surface.

In this way, because an abradable coating constituted of an abradable material is formed on the opposing surface, for example, it is possible to significantly suppress the amount of heat generated when the fins come into contact therewith. Accordingly, because the gap between the fins and the opposing surface can be set so as to allow contact therebetween to some extent, sealing performance can be enhanced by setting the set gap between the fins and the opposing surface even smaller.

With a seal structure for a rotary machine according to the present invention, at a position on a high-pressure portion side of a seal ring, an adjusting flow path that connects a flow path to the same pressure source as a low-pressure portion and an open/close valve that is provided in the adjusting flow path and opens and closes the adjusting flow path are provided; therefore, it is possible to enhance sealing performance and to enhance reliability.

In addition, it is possible to achieve enhanced reliability and enhanced performance of a rotary machine using the same.

DETAILED DESCRIPTION OF THE INVENTION

A steam turbine provided with a seal structure according to an embodiment of the present invention will be described below with reference to FIGS. 1 to 7. This steam turbine 1 is of a type referred to as a high/medium pressure integrated steam turbine.

Figure 1:
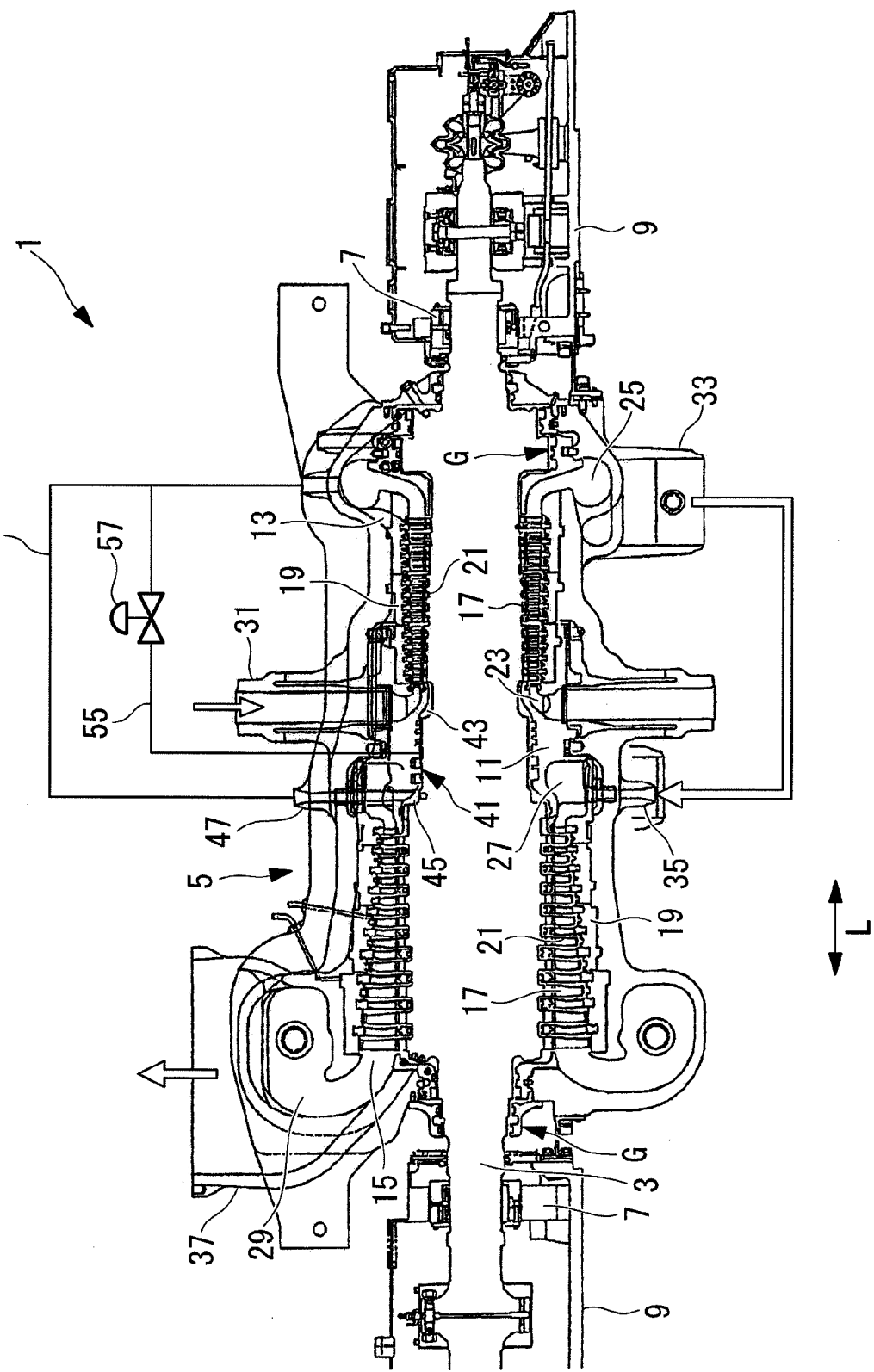
FIG. 1 is a longitudinal sectional view of a steam turbine according to a first embodiment of the present invention.
Figure 2:
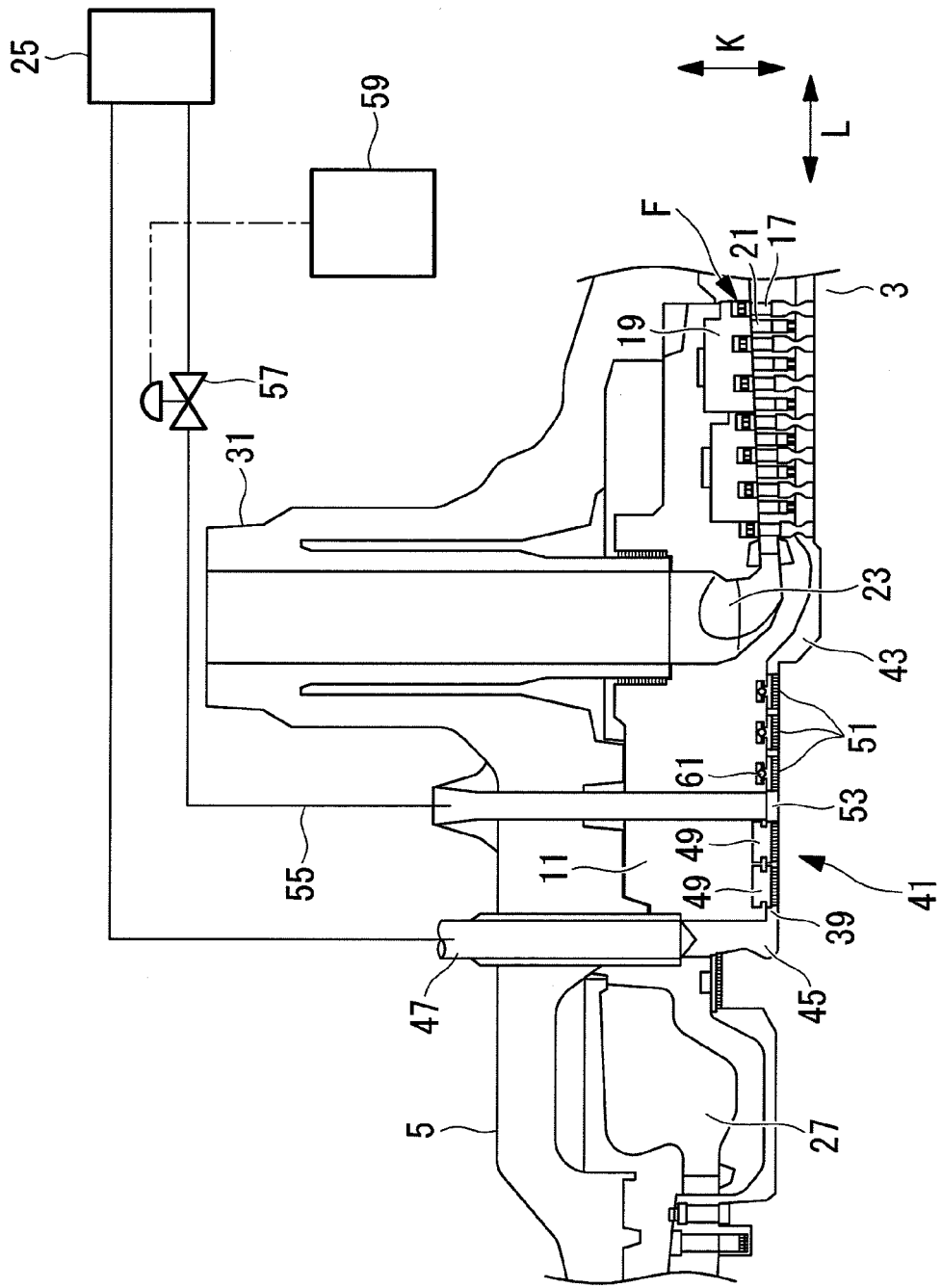
FIG. 2 is a partially enlarged view of FIG. 1.

FIG. 1 is a longitudinal sectional view of the steam turbine 1 according to this embodiment. FIG. 2 is an enlarged view of relevant portions of FIG. 1.

A steam turbine 1 is provided with a turbine rotor (rotating body) 3 and a casing (stationary portion) 5 that houses this turbine rotor 3.

The turbine rotor 3 is supported at both end portions so as to be rotatable relative to pedestals 9 via bearings 7.

An internal space of the casing 5 is partitioned by a high-pressure dummy ring (stationary portion) 11 into a high-pressure casing space 13 and a medium-pressure casing space 15. The high-pressure dummy ring 11 is an annular member fixedly attached inside the casing 5.

In portions of a circumferential surface of the turbine rotor 3 that correspond to the high-pressure casing space 13 and the medium-pressure casing space 15, numerous rotor blades 17, which protrude radially outward, are attached in a plurality of stages with gaps therebetween in an axial direction L.

In the inside of the casing 5, in portions thereof that correspond to the high-pressure casing space 13 and the medium-pressure casing space 15, a plurality of blade rings 19 are respectively attached in the axial direction L.

A plurality of numerous stator blades 21, which protrude radially inward, are attached to each blade ring 19 with gaps therebetween in the axial direction.

The stator blades 21 generate velocity energy by expanding steam passing therethrough and gain momentum in the direction of rotation by changing the flow direction.

The rotor blades 17 absorb the energy of the steam converted to velocity energy by the stator blades 21 and convert it to rotational energy of the turbine rotor 3.

For this reason, the rotor blades 17 and the stator blades 21 are alternately arranged in the axial direction L, respectively. Hereinafter, the rotor blades 17 and the stator blades 21 arranged in the high-pressure casing space 13 may be collectively referred to as a high-pressure stage, and the rotor blades 17 and the stator blades 21 arranged in the medium-pressure casing space 15 may be collectively referred to as a medium-pressure stage.

The high-pressure casing space 13 has an annular high-pressure inlet portion 23 on the medium-pressure casing space 15 side and, on the opposite side thereof in the axial direction, an annular high-pressure outlet portion (single pressure source) 25.

The medium-pressure casing space 15 has an annular medium-pressure inlet portion 27 on the high-pressure casing space 13 side and, on the opposite side thereof in the axial direction, an annular medium-pressure outlet portion 29.

The high-pressure inlet portion 23 is formed, communicating with a main steam pipe 31, so as to receive steam supplied from a boiler (not shown) via the main steam pipe 31. The inflowing steam performs work in the high-pressure stage and is then introduced from the high-pressure outlet portion 25 as high-pressure exhaust steam via a high-pressure outlet pipe 33. This high-pressure exhaust steam is introduced to the medium-pressure inlet portion 27 via a medium-pressure inlet pipe 35.

At this time, the high-pressure exhaust gas may be reheated by the boiler (not shown).

The high-pressure exhaust steam introduced to the medium-pressure inlet portion 27 performs work in the medium-pressure stage and is then discharged from the medium-pressure outlet portion 29 via a medium-pressure exhaust pipe 37.

Next, a seal structure 41 for a high-pressure dummy 39, which forms a gap between the high-pressure dummy ring 11 and the turbine rotor 3, will be described.

A high-pressure side steam chamber (high-pressure portion) 43, into which an escaped portion of steam flowing from the high-pressure inlet portion 23 to the high-pressure stage flows, is provided on the high-pressure casing space 13 side of the high-pressure dummy 39. A medium-pressure side steam chamber (low-pressure portion) 45, which communicates with the medium-pressure inlet portion 27, is provided on the medium-pressure casing space 15 side of the high-pressure dummy 39.

The medium-pressure side steam chamber 45 communicates with the high-pressure outlet portion 25 via a pressure equalizing pipe (connecting flow path) 47 and is maintained at a pressure substantially equivalent to the pressure of the high-pressure exhaust steam in the high-pressure outlet portion 25. On the other hand, the high-pressure side steam chamber 43 has a pressure substantially equal thereto because steam therein escaped from steam introduced to the high-pressure stage.

In other words, the pressure in the high-pressure side steam chamber 43 is greater than the pressure in the medium-pressure side steam chamber 45.

The high-pressure dummy 39 is provided, in the axial direction from the medium-pressure steam chamber 45 side, with two active clearance control seal rings (corresponding to a seal ring of the present invention; hereinafter referred to as AAC seal rings) 49 and three spring-back seal rings (high-pressure side seal rings) 51.

These two ACC seal rings 49 constitute a movable seal structure of the present invention.

An adjusting portion 53 located between the ACC seal rings 49 and the spring-back seal rings 51 in the high-pressure dummy 39, in other words, on the high-pressure side steam chamber 43 side of the ACC seal rings 49, communicates with the high-pressure outlet portion 25 via an adjusting pipe (adjusting flow path) 55.

The adjusting pipe 55 is provided with an open/close valve 57 that opens and closes a steam flow path in the adjusting pipe 55. The open/close valve 57 is, for example, a solenoid valve and opens and closes in response to a control signal, from an open/close valve controller (controller) 59.

The spring-back seal rings 51 are annular members held in an inner circumferential surface of the high-pressure dummy ring 11.

A plurality of fins, which protrude in a ring-like manner, are provided in an inner surface of the spring-back seal rings 51, and these fins and the turbine rotor 3 form a labyrinth seal structure.

The spring-back seal rings 51 are circumferentially divided into a plurality of pieces, for example, two, each of which is movable in a substantially radial direction relative to the high-pressure dummy ring 11, that is, in a direction toward and away from the turbine rotor 3.

Springs 61 are interposed between the high-pressure dummy ring 11 and an outer circumference side of the spring-back seal rings 51. The spring-back seal rings 51 are pressed toward the turbine rotor 3 by these springs 61 so as to hold a predetermined positional relationship.

In the event that the fins of the spring-back seal rings 51 come into contact with the turbine rotor 3, part of the impact thereof is absorbed by the springs 61.

Figure 3:
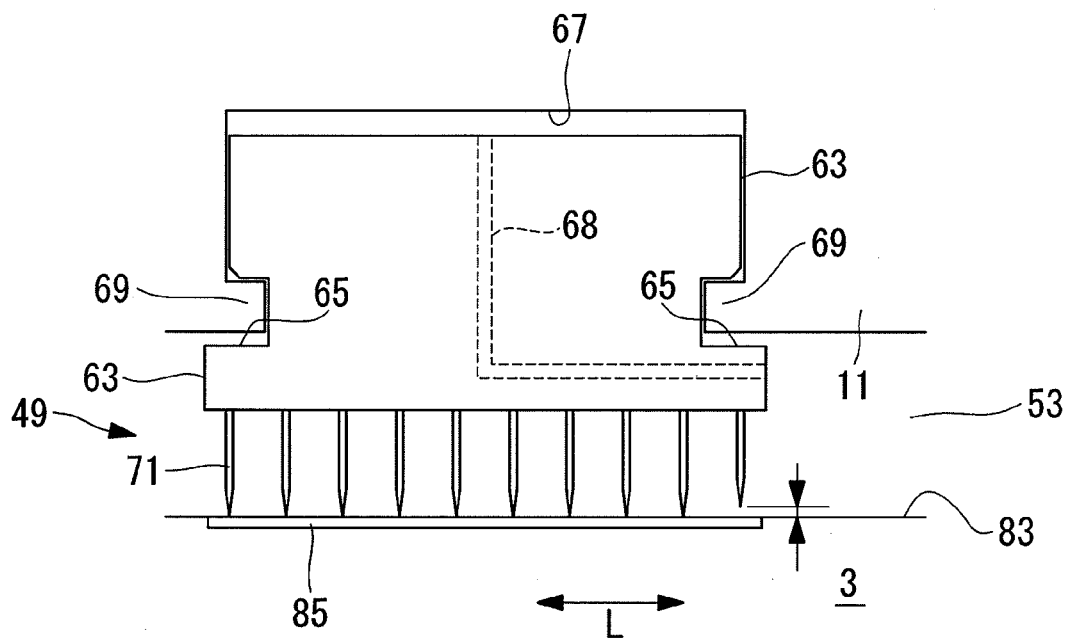
FIG. 3 is a sectional view taken along an axial line of a movable seal ring according to the first embodiment of the present invention.

Next, the ACC seal rings 49 will be described, using FIGS. 3 and 4.

The ACC seal rings 49 are annular members held in the inner circumferential surface of the high-pressure dummy ring 11.

The ACC seal rings 49 have a substantially rectangular cross section along the axial direction L. At end surfaces 63 on both sides of the ACC seal rings 49 in the axial direction L, fitting grooves 65, which extend over substantially the entire circumference thereof, are provided.

In the inner circumferential surface of the high-pressure dummy ring 11, circumferential grooves 67 are provided so as to extend over substantially the entire circumference thereof. At inner circumference side end portions of the circumferential grooves 67, protruding portions 69, which protrude inwardly of the circumferential grooves 67, are provided so as to extend over substantially the entire circumference thereof.

The ACC seal rings 49 are fitted to the circumferential grooves 67 such that the protruding portions 69 engage with the fitting grooves 65, and are thus held in the high-pressure dummy ring 11.

On an inner circumferential surface of the AAC sealing rings 49, a plurality of fins 71, which protrude in a ring-like manner in the circumferential direction, are provided in the axial direction L with gaps therebetween. The fins 71 are attached to the ACC seal rings 49 by slotting them therein.

Note that, the fins 71 may be integrally formed with the ACC seal rings 49 by milling.

Figure 4:
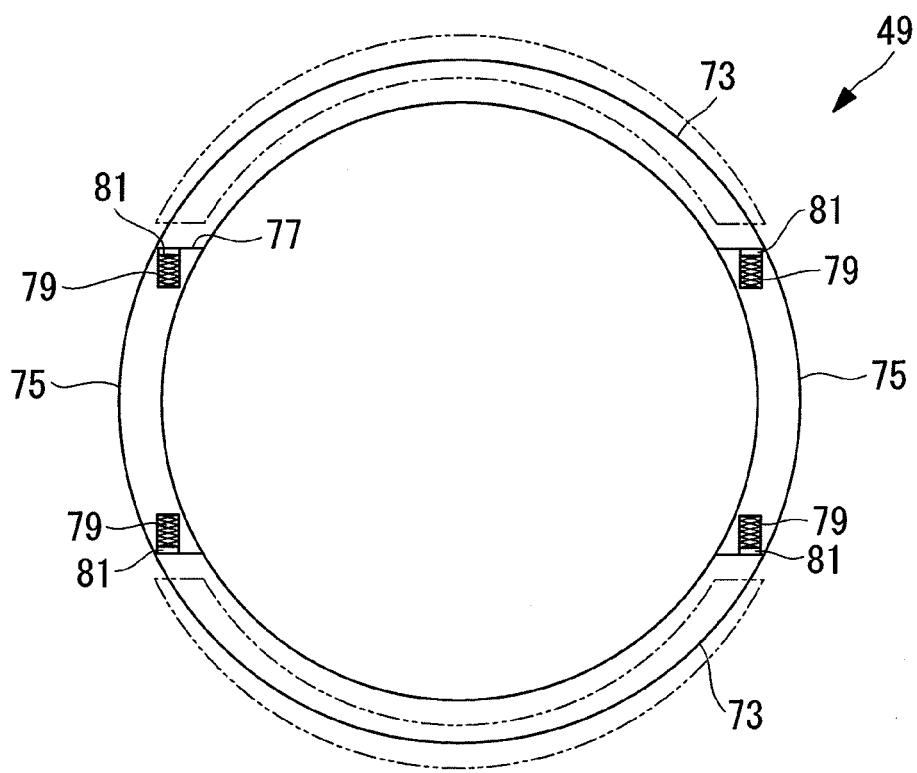
FIG. 4 is a side view showing, in outline, the configuration of an ACC seal ring according to the first embodiment of the present invention.

As shown in FIG. 4, the ACC seal rings 49 are divided in the circumferential direction and are formed of a top-bottom pair of movable seal rings 73 and a left-right pair of securing seal rings 75.

The movable seal rings 73, in a cross sectional view, extend over 120 degrees in the circumferential direction relative to a center position thereof. At both ends thereof, the securing seal rings 75 are disposed within a range of 30 degrees each on both sides from the horizontal dividing plane of the machine.

Meeting surfaces 77 where the movable seal rings 73 and the securing seal rings 75 join are formed of flat surfaces in a substantially horizontal direction. As shown in FIG. 4, holding plates 81, which are biased toward the securing seal rings by disc springs (elastic pieces) 79, are mounted on the meeting surfaces 77. Due to the disc springs, the holding plates 81 constantly press the movable seal rings 73 upward or downward (macroscopically, the radial direction, overlapping with the radial direction at the center of the movable seal rings 73). The movable seal rings 73 are vertically guided by guiding members (not shown).

The movable seal rings 73 are provided with communicating holes 68 that communicate between a portion located on the high-pressure side of the high-pressure dummy 39 and the circumferential grooves 67.

An abradable layer (abradable coating) 85 is formed on a circumferential surface (opposing surface) 83 of the turbine rotor 3 facing the fins 71.

The abradable layer 85 is formed as follows.

As an abradable material, one that includes a metal constituent containing cobalt, nickel, chrome, aluminum, and yttrium (Co, Ni, Cr, Al, Y) as a main component, boron nitride (h-BN) as a solid lubricant, and polyester for controlling porosity is used, which is sprayed using atmospheric plasma spraying (APS: Atmospheric Plasma Spraying).

Then, heat processing is performed at 500 to 650° C. Polyester contained in the abradable layer 85 is eliminated by this amount of heat.

Accordingly, because the abradable layer 85 is formed as a porous structure, the hardness of the abradable layer can be reduced, and the quantity of heat generated by sliding at the time of contact with the fins 71 can be reduced.

The hardness and the porosity of the abradable layer 85 can be adjusted by adjusting the polyester content. It is desirable to adjust the polyester content such that the hardness is, for example, 300 Hv or less, and the porosity is, for example, 40% or greater.

The high-pressure dummy 39 portion is provided with an extensometer that measures a relative positional relationship in the axial direction L between the high-pressure dummy ring 11 and the turbine rotor 3 and a gap sensor that measures a relative positional relationship therebetween in a radial direction K. A gap between distal end portions of the fins 71 and the circumferential surface of the turbine rotor 3 can be calculated by using the measurement result from the gap sensor.

An adjustment controller 59 is provided with a function to determine whether the high-pressure dummy ring 11 and the turbine rotor 3 are in a thermally stable state, by receiving measurement results from the extensometer and the gap sensor, as well as information regarding the rotational speed of the turbine rotor 3 and the load status of the steam turbine 1 from an operation controller, which controls the operation of the steam turbine 1. The adjustment controller 59 controls opening and closing of the open/close valve 57 depending on the result of the determination.

Note that a thermally stable state is a state in which the high-pressure dummy ring 11 and the turbine rotor 3 show almost no relative positional fluctuations in the axial direction L and the radial direction K.

Here, when determining whether the high-pressure dummy ring 11 and the turbine rotor 3 are in a thermally stable state, the adjustment controller 59 is assumed to use the measurement results from the extensometer and the gap sensor, as well as the information regarding the rotational speed of the turbine rotor 3 and the load status of the steam turbine 1; however, it is acceptable to use only part of this information. In addition, the information regarding temperature, pressure, etc. in the casing 5 or the high-pressure dummy 39 may be used.

The operation of a seal structure 41 configured as above will be described.

When the steam turbine 1 is started up, steam is introduced from the main steam pipe 31; the inflowing steam performs work at the high-pressure stage and is guided out as high-pressure exhaust steam from the high-pressure outlet portion 25 via the high-pressure outlet pipe 33. This high-pressure steam is introduced to the medium-pressure inlet portion 27 via the medium-pressure inlet pipe 35.

The high-pressure exhaust steam introduced into the medium-pressure inlet portion 27 performs work at the medium-pressure stage and is discharged from the medium-pressure outlet portion 29 via the medium-pressure exhaust pipe 37.

Then, the load of the steam turbine is increased by gradually increasing the amount of steam introduced.

At this time, individual portions of the steam turbine 1 thermally expand in the axial direction L and the radial direction K due to the amount of heat in the steam; however, because conditions of the heat expansion differ among individual portions, that is, because there is a rate variation, relative positions of the individual portions in the axial direction L and the radial direction K continue to change until the heat expansion, etc. in the individual portions stabilizes. The amount of change in the gap (displacement in the radial direction) between the high-pressure dummy ring 11 and the turbine rotor 3 due to the load is plotted as the one-dot chain line C in FIG. 6.

In addition, because part of the steam that flows into the high-pressure stage from the high-pressure inlet portion 23 escapes to the high-pressure side steam chamber 43, pressure P1 in the high-pressure side steam chamber 43 also gradually increases.

On the other hand, because the medium-pressure side steam chamber 45 communicates with the high-pressure outlet portion 25, pressure P3 in the medium-pressure side steam chamber 45 is equalized to the pressure of the high-pressure exhaust steam in the high-pressure outlet portion 25. As the pressure in the high-pressure side steam chamber increases, the pressure in the medium-pressure steam chamber 45 also increases.

Because the pressure P1 in the high-pressure side steam chamber 43 is substantially identical to the pressure of steam introduced to the high-pressure inlet portion 23, the pressure P1 is greater than the pressure P3 in the medium-pressure side steam chamber 45, which is substantially equal to the pressure in the high-pressure outlet portion 25.

During start-up of the steam turbine 1, the adjustment controller 59 opens the open/close valve 57, thereby letting the adjusting portion 53 of the high-pressure dummy 39 communicate with the high-pressure outlet portion 25.

Therefore, because the steam in the high-pressure side steam chamber 43, whose pressure is reduced by pressure loss due to the three spring-back seal rings 51 mixes with the steam in the high-pressure outlet portion 25 in the adjusting portion 53, pressure P2 in the adjusting portion 53 is equalized. Because of this, even when the steam pressure in the high-pressure side steam chamber 43 increases, the pressure P2 in the adjusting portion 53 becomes a pressure that is approximately equal to the pressure in the high-pressure outlet portion 25.

Therefore, the magnitude of the pressure P2 in the adjusting portion 53 differs little from the pressure P3 in the medium-pressure side steam chamber 45.

The inner circumferential surface of the movable seal rings 73 experiences the pressure of steam passing the lower portion thereof, thereby tending to move the movable seal rings 73 radially outward. On the other hand, the pressure of steam inflowing through a gap between the high-pressure-side side surface 63 and the high-pressure dummy ring 11 and through the communication hole 68, that is, the pressure P2 in the adjusting portion 53, acts on the outer circumferential surface of the movable seal rings 73, thereby tending to move the movable seal rings 73 radially inward.

In general, because it experiences pressure loss due to the fins 71, the pressure of steam passing the lower portion of the inner circumferential surface of the movable seal rings 73 successively becomes lower than the pressure P2 in the adjusting portion 53, as the steam advances. Because of this, pressure acting on the outer circumferential surface becomes greater than that on the inner circumferential surface. Because this differential pressure becomes greater as a differential pressure between the pressure P2 in the adjusting portion 53 and the pressure P3 in the medium-pressure side steam chamber 45 increases, the movable seal rings 73 are moved inward in the radial direction K by overcoming the biasing force of the disc springs 79.

During start-up, the pressure P2 in the adjusting portion 53 is substantially equal to the pressure P3 in the medium-pressure side steam chamber 45; therefore, the pressure difference (differential pressure) between the steam acting on the outer circumferential surface and the inner circumferential surface of the movable seal rings 73 is small. Therefore, due to the biasing force of the disc springs 79, the movable seal rings 73 are placed at the outer side, that is, at a position where the lower surface of the circumferential grooves 65 abuts the lower surface of the protruding portions 69. Accordingly, because a state in which the gap set between the fins 71 and the circumferential surface 83 is large is maintained, it is possible to prevent contact between the fins 71 and the circumferential surface 83 by setting an adequate gap to cope with a sudden approaching of the fins and the opposing surface during start-up.

Figure 5:
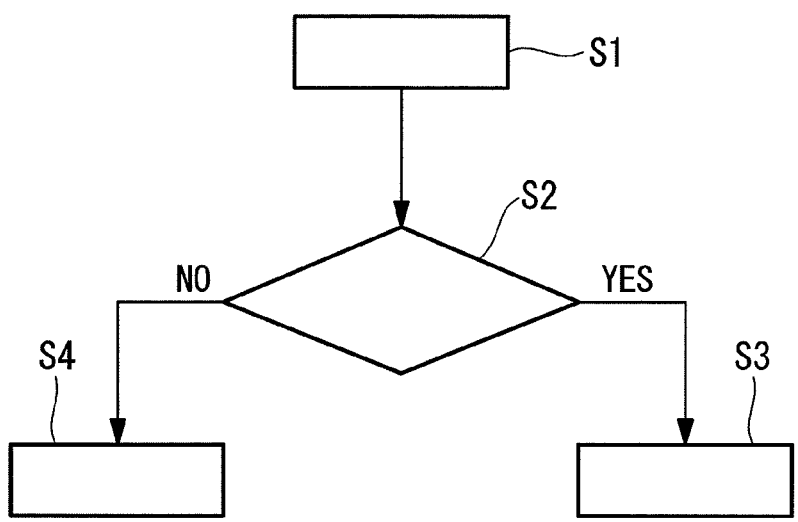
FIG. 5 is a flow chart showing processing of an adjustment controller according to the first embodiment of the present invention.

FIG. 5 shows a flow chart for control by the adjustment controller 59.

The adjustment controller 59 begins control (Step S1) when the steam turbine 1 is started up.

The adjustment controller 59 determines whether the high-pressure dummy ring 11 and the turbine rotor 3 are in a thermally stable state (Step S2) by receiving the measurement results from the extensometer and the gap sensor, as well as the information regarding the rotational speed of the turbine rotor 3 and the load condition of the steam turbine 1 from the operation controller which controls the operation of the steam turbine 1.

When the adjustment controller 59 determines that the high-pressure dummy ring 11 and the turbine rotor 3 are in a state in which there are almost no relative positional fluctuations therebetween in the axial direction L and the radial direction K, they are determined to be in a thermally stable state.

When the adjustment controller 59 determines that they are in a thermally stable state, it gives the open/close valve 57 a signal instruction to close (Step S3). When the closing signal is issued, the open/close valve 57 is closed if it is open and, if it is already closed, it remains in that state.

When the adjustment controller 59 determines that they are not in a thermally stable state, it gives the open/close valve 57 a signal instruction to open (Step S4). When the opening signal is transmitted, the open/close valve 57 is opened if it is closed and, if it is already open, it remains in that state.

Figure 6:
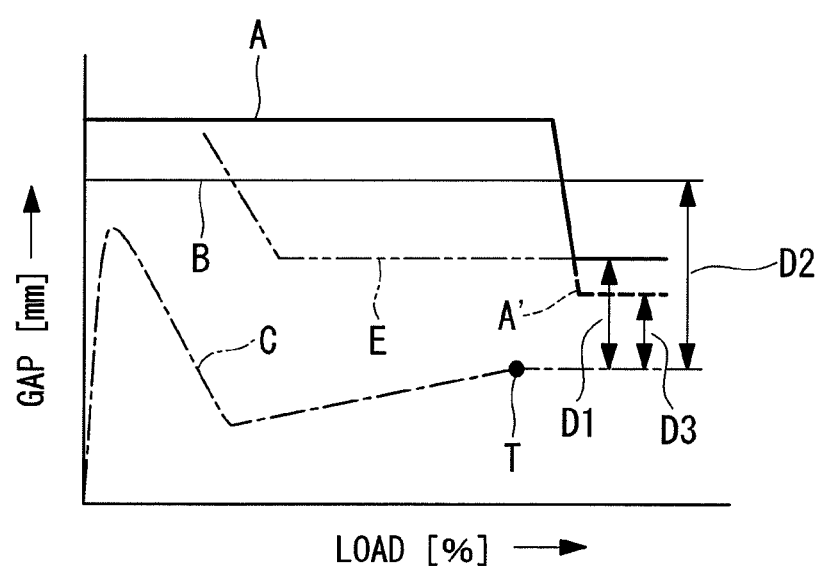
FIG. 6 is a graph showing the change in a gap according to the first embodiment of the present invention, as compared with that of the related art.

As the operation of the steam turbine 1 advances, the load increases and, for example, when the rated operation is achieved, the high-pressure dummy ring 11 and the turbine rotor 3 reach a thermally stable state (for example, even if the load increases at point T on the one-dot chain line C in FIG. 6, the gap between the high-pressure dummy ring 11 and the turbine rotor 3 remains unchanged). By detecting this, the adjustment controller 59 gives the open/close valve 57 the signal instruction to close. Accordingly, the open/close valve 57 is closed, thereby shutting off the communication between the high-pressure outlet portion 25 and the adjusting portion 53 with the adjusting pipe 55.

When the communication between the high-pressure outlet portion 25 and the adjusting portion 53 is shut off in this way, because the pressure in the high-pressure outlet portion 25 ceases to act on the adjusting portion 53, the pressure P2 in the adjusting portion 53 quickly reaches the pressure in the high-pressure side steam chamber 43 that is subjected to pressure loss due to the three spring-back seal rings 51.

At this time, because it is in a state of rated operation, the pressure P1 in the high-pressure side steam chamber 43 is at a pressure considerably greater than the pressure of the high-pressure exhaust steam, that is, the pressure P2 in the medium-pressure side steam chamber 45.

When the pressure of steam in the adjusting portion 53 increases, because a pressure difference between the outer circumferential surface and the inner circumferential surface of the movable seal rings 73 due to the fluid acting thereon increases until the biasing force of the disc springs 79 is overcome, the movable seal rings 73 are moved radially inward.

Therefore, the movable seal rings 73 are located at the inner side, that is, at a position at which the top surface of the circumferential grooves 65 abuts the top surface of the protruding portions 69, in other words, the inner end of the moving range.

At this time, because the pressure in the adjusting portion 53 is quickly changed when the open/close valve 57 is closed, the pressure difference between the outer circumferential surface and the inner circumferential surface of the movable seal rings 73 due to the fluid acting thereon suddenly increases. Therefore, even if friction force acts between a side surface of the movable seal rings 73 and the high-pressure dummy ring 11, the movable seal rings 73 are quickly and smoothly moved inward.

In FIG. 6, a thick line A shows changes, in the process of a load increase from start-up to reaching the rated operation, in the set gap between the fins 71 and the circumferential surface 83 of the turbine rotor 3, which is formed by movement of the movable seal rings 73 in this embodiment in the radial direction. The one-dot chain line C shows changes in the gap between the high-pressure dummy ring 11 and the turbine rotor 3. Because a set gap between the fins 71 and the circumferential surface 83 of the turbine rotor 3 is constant in a seal without the movable seal rings 73, the gap follows a solid line B.

In addition, as a reference, a two-dot chain line E shows changes in a set gap between the fins 71 and the circumferential surface 83 of the turbine rotor 3 when the adjusting pipe 55 and the open/close valve 57 are not provided, as described in the Background Art.

The difference between the one-dot chain line C and the thick line A, the solid line B, or the two-dot chain line E is the actual gap between the circumferential surface 83 of the turbine rotor 3 and the fins 71.

At a load larger than the point T indicating rated operation, a difference D1 between the one-dot chain line C and the thick line A or the two-dot chain line E is smaller than a difference D2 between the one-dot chain line C and the solid line B, thereby enhancing sealing performance during rated operation.

Furthermore, in this embodiment, because the abradable layer 85 is formed on the circumferential surface 83 (facing the fins 71) of the turbine rotor 3, for example, it is possible to considerably suppress heat generation when it comes into contact with the fins 71. Accordingly, because the gap between the fins 71 and the circumferential surface 83 can be set to allow contact therebetween to some extent, sealing performance can be enhanced by setting the actual gap between the fins 71 and the circumferential surface 83 even smaller (a difference D3 between a thick dotted line A' and the one-dot chain line C), as indicated by the think dotted line A'.

When halting the steam turbine 1 during the rated operation in which the open/close valve 57 is closed, the adjustment controller 59 performs processes following the flow chart in FIG. 5.

That is, when an unstable state is detected by determining whether the high-pressure dummy ring 11 and the turbine rotor 3 are in a thermally stable state, the open/close valve 57 is instructed with the opening signal. Accordingly, the open/close valve 57 is opened, thereby letting the adjusting portion 53 of the high-pressure dummy 39 communicate with the high-pressure outlet portion 25. As a result, because the steam in the high-pressure side steam chamber 43 whose pressure is reduced by pressure loss due to the three spring-back seal rings 51 mixes with the steam in the high-pressure outlet portion 25 in the adjusting portion 53, the pressure P2 in the adjusting portion 53 is equalized. Accordingly, even when the steam pressure in the high-pressure side steam chamber 43 is high, as it is during the rated operation, the pressure P2 in the adjusting portion 53 becomes a pressure approximately equal to the pressure in the high-pressure outlet portion 25.

Therefore, the magnitude of the pressure P2 in the adjusting portion 53 hardly differs from the pressure P3 in the medium-pressure side steam chamber 45.

Because, as a result, the pressure difference between the outer circumferential surface and the inner circumferential surface of the movable seal rings 73 due to the steam acting thereon decreases, the movable seal rings 73 are moved radially outward by the biasing force of the disc springs 79.

At this time, because fluctuations in pressure in the adjusting portion 53 increase and become drastic, the fluctuations in the force acting in the radial direction of the movable seal rings 73 correspondingly increases. Accordingly, because the movable seal rings 73 can smoothly move in the radial direction without being affected by large friction force exerted between the side surfaces 63 and the high-pressure dummy ring 11, the actuation timing can be guaranteed.

Accordingly, for example, even in the case of a load drop accompanied by a sudden steam-temperature-drop phenomenon, in which the gap between the fins 71 and the circumferential surface 83 rapidly closes, because a delay in withdrawing the movable seal rings 73 radially outward can be suppressed, the risk of contact between the fins 71 and the circumferential surface 83 can be reduced.

In this way, the actuation of the movable seal rings in the radial direction can be reliably controlled by opening and closing the open/close valve. Accordingly, for example, the gap between the fins and the opposing surface during the rated operation can be set small, and thus, sealing performance can be enhanced. In addition, because, for example, contact between the fins and the opposing surface can be reliably prevented during start up/shut down by setting this gap large, the reliability of the seal structure can be enhanced.

Note that, the present invention is not limited to the embodiment described above, and appropriate alterations are possible without departing from the gist of the present invention.

In other words, in this embodiment, the ACC seal rings 49 are provided in two stages in the axial direction; however, it may be a single stage or three or more stages. In addition, the adjusting portion 53 is installed between the ACC seal rings 49 and the spring-back seal rings 51; however, it may be installed in an intermediate position in the plurality of spring-back seal rings 51.

Furthermore, although the spring-back seal rings 51 are used as pressure loss members, any appropriate means may be employed without being limited thereto.

Figure 7:
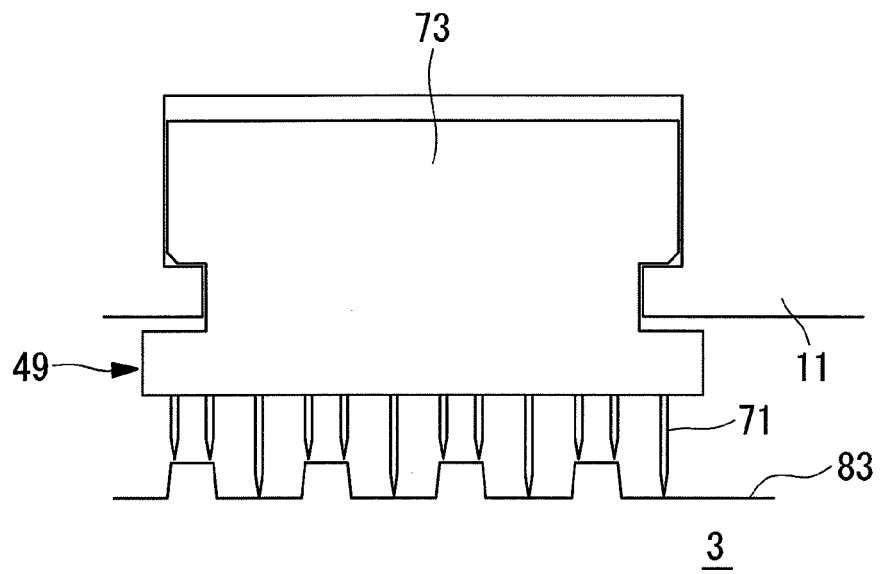
FIG. 7 is a sectional view, taken along an axial line, showing another embodiment of the movable seal ring according to the first embodiment of the present invention.

In addition, in this embodiment, the circumferential surface 83 of the turbine rotor 3 is assumed to be a smooth surface; however, as shown in FIG. 7, depressions and protrusions may be formed thereon in the axial direction L, and the length of the fins 71 may be adjusted in accordance therewith. By doing so, because the steam passing through moves in a zig-zag manner, the sealing performance can be enhanced even with the same gap.

Also, the abradable layer 85 need not be employed.

Figure 8:
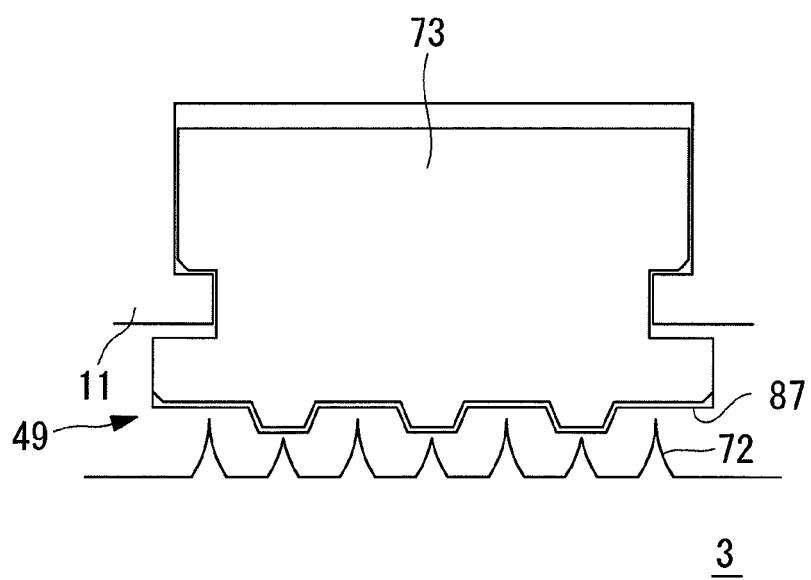
FIG. 8 is a sectional view, taken along an axial line, showing another embodiment of the movable seal ring according to the first embodiment of the present invention.

In addition, in this embodiment, the fins 71 are provided on the ACC seal rings 49 side; however, as shown in FIG. 8, they may be provided on the turbine rotor 3 side. These fins 72 are integral with the turbine rotor 3, and are, for example, formed by milling; however, fins 72 that are separate pieces may be slotted into the turbine rotor 3.

In addition, in the one shown in FIG. 8, depressions and protrusions are formed on the ACC seal rings in the axial direction, and the length of the fins 72 is adjusted in accordance thereto. An abradable layer 87 is formed on the inner circumferential surface of the ACC seal rings 49.

In this embodiment, the present invention is applied to a seal structure of the high-pressure dummy 39; however, it may be applied to a seal structure of a gland G (see FIG. 1) that performs sealing against atmospheric air, or to a seal structure at a distal end portion F (see FIG. 2) of rotor blades 17 or stator blades 21.

Application to a seal structure in a rotary machine other than a steam turbine, such as a gas turbine, a compressor, etc. is possible.

The invention claimed is:

1. A seal structure for partitioning a high-pressure portion and a low-pressure portion of a rotary machine, the seal structure comprising: at least one stage of high-pressure side seal rings disposed on a high-pressure side of the seal structure, the high-pressure side seal rings being held in a stationary portion, so as to oppose a circumferential surface of a rotating member; at least one stage of seal rings disposed on a low-pressure side of the seal structure, the seal rings being held in a stationary portion, so as to oppose the circumferential surface of the rotating member; and fins protruding in a ring manner, and being disposed in at least one of the seal rings and the rotating member, wherein each of the seal rings has an adjustable movable seal ring, which is movable in a substantially radial direction, and at least at a portion thereof in the circumferential direction, and which is biased outward in the radial direction by an elastic piece, and which is configured to partition the high-pressure portion and the low-pressure portion with the fins and an opposing surface opposing the fins, a holding member for holding the adjustable movable seal ring is arranged so as to dispose a gap between an inner circumferential surface of the holding member and an outer circumferential surface of the adjustable movable seal ring, and the adjustable movable seal ring includes a communication hole communicating between a high-pressure side of the adjustable movable seal ring and the gap, the seal structure further comprising a connecting flow path connected to a single pressure source, on a low-pressure side of the adjustable movable seal ring, the connecting flow path continuously communicating between the low-pressure side of the adjustable movable seal ring and the single pressure source;

an adjusting flow path connecting the high-pressure side of the adjustable movable seal ring to the single pressure source; and an open/close valve disposed in the adjusting flow path and being configured to open and close the adjusting flow path, the open/close valve being open during start-up operation of the rotary machine and being closed during rated operation of the rotary machine, the open/close valve continuously communicating between the high-pressure side of the adjustable movable seal ring and the single pressure source when the open/close valve is opened; and a controller configured to determine whether the rotating member and the stationary portion are in a thermally stable state and control opening and closing of the open/close valve depending on the result of the determination.

2. A seal structure for a rotary machine according to claim 1, wherein an abradable coating formed of an abradable material is on the opposing surface.

3. A seal structure for a rotary machine according to claim 1, wherein the holding members are dummy rings, and each of the seal rings is fitted into a circumferential groove in a respective dummy ring.

4. A seal structure for partitioning a high-pressure portion and a low-pressure portion of a rotary machine, the seal structure comprising:

at least one stage of seal rings held in a stationary portion, so as to oppose a circumferential surface of a rotating member; fins protruding in a ring manner, and being disposed in at least one of the seal rings and the rotating member, wherein each of the seal rings has an adjustable movable seal ring, which is movable in a substantially radial direction, and at least at a portion thereof in the circumferential direction, and which is biased outward in the radial direction by an elastic piece, and which is configured to partition the high-pressure portion and the low-pressure portion with the fins and an opposing surface opposing the fins, a holding member for holding the adjustable movable seal ring is arranged so as to dispose a gap between an inner circumferential surface of the holding member and an outer circumferential surface of the adjustable movable seal ring, and the adjustable movable seal ring includes a communication hole communicating between a high-pressure side of the adjustable movable seal ring and the gap, the seal structure further comprising a connecting flow path connected to a single pressure source, on a low-pressure side of the adjustable movable seal ring, the connecting flow path continuously communicating between the low-pressure side of the adjustable movable seal ring and the single pressure source; an adjusting flow path connecting the high-pressure side of the adjustable movable seal ring to the single pressure source; and an open/close valve disposed in the adjusting flow path and being configured to open and close the adjusting flow path, the open/close valve being open during start-up operation of the rotary machine and being closed during rated operation of the rotary machine, the open/close valve continuously communicating between the high-pressure side of the adjustable movable seal ring and the single pressure source when the open/close valve is opened; and a controller configured to control opening and closing of the open/close valve in response to a determination that the rotating member and the stationary portion are in a thermally stable state.

5. A seal structure for a rotary machine according to claim 1, wherein the controller determines whether the rotating member and the stationary portion are in the thermal stable state on the basis of measurement results from an extensometer and a gap sensor, rotations speed of the rotating member, and load status of the rotary machine.

\* \* \* \* \*